US010266456B2

(12) United States Patent
Connell

(10) Patent No.: US 10,266,456 B2
(45) Date of Patent: Apr. 23, 2019

(54) WET MILLED ORGANIC FERTILIZER AND FEED PRODUCT

(71) Applicant: GREEN TRIANGLE CORPORATION, Yakima, WA (US)

(72) Inventor: Larry V. Connell, Yakima, WA (US)

(73) Assignee: GREEN TRIANGLE CORPORATION, Yakima, WA (US)

( * ) Notice: Subject to any disclaimer, the term of this patent is extended or adjusted under 35 U.S.C. 154(b) by 181 days.

(21) Appl. No.: 14/990,727

(22) Filed: Jan. 7, 2016

(65) Prior Publication Data

US 2017/0197889 A1 Jul. 13, 2017

(51) Int. Cl.
| C05F 11/08 | (2006.01) |
| C05B 17/00 | (2006.01) |
| C05B 19/00 | (2006.01) |
| C05G 3/00 | (2006.01) |

(52) U.S. Cl.
CPC .............. *C05B 17/00* (2013.01); *C05B 19/00* (2013.01); *C05F 11/08* (2013.01); *C05G 3/0094* (2013.01)

(58) Field of Classification Search
None
See application file for complete search history.

(56) References Cited

U.S. PATENT DOCUMENTS

| 4,259,361 A * | 3/1981 | Procter | C05F 1/00 426/285 |
| 4,975,106 A * | 12/1990 | Ferguson | C05F 1/002 71/10 |
| 8,574,870 B1 * | 11/2013 | Calt, Jr. | C12M 21/04 429/408 |
| 9,233,068 B2 * | 1/2016 | Lichter | A61K 9/0024 |
| 2002/0053229 A1 * | 5/2002 | Varshovi | C05D 9/00 71/6 |
| 2008/0318777 A1 * | 12/2008 | Lin | C05D 9/02 504/117 |
| 2012/0031157 A1 * | 2/2012 | Paikray | C05F 11/08 71/7 |
| 2012/0057936 A1 * | 3/2012 | Cook | C05F 9/04 405/128.7 |
| 2013/0255338 A1 * | 10/2013 | Lopez-Cervantes | C05F 11/08 71/7 |
| 2013/0344558 A1 * | 12/2013 | Green | C05F 5/00 435/170 |

* cited by examiner

*Primary Examiner* — Wayne A Langel
(74) *Attorney, Agent, or Firm* — Svendsen Legal, LLC

(57) ABSTRACT

A compatible combination of micron size carbon based particles along with beneficial microbial species and conventional plant nutrients into a plant or an animal food. This balanced product is a combination of nutrients and microbes, and can be applied as a suspension in water or as a slow release granule. This combination of organic plant food and fertilizer can also be applied as a foliar, as a seed coating, and as an all-in-one granule combination of nutrients and biological agents, to facilitate mineralization, nutrient availability and provide energy to the soil and plants, with a total conversion of a storable processed biomass into a precisely known quality and quantity of usable fertilizer 'tea' solution, with no biomass waste, odors, or crop application timing problems. The process of formulating the combination product reduces green house gas emissions by limiting mineralization and composting.

17 Claims, 1 Drawing Sheet

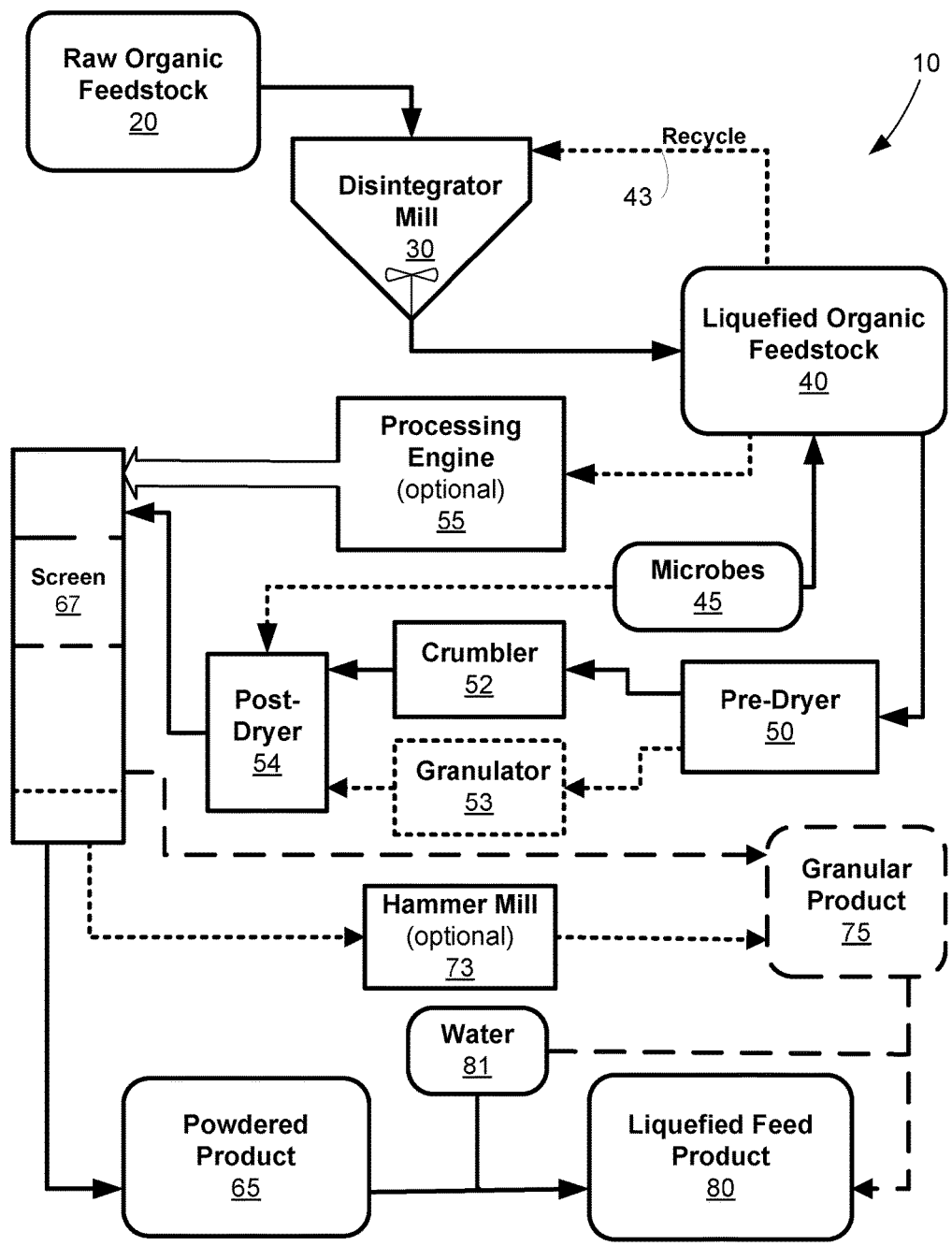

WET MILLED ORGANIC FERTILIZER AND FEED PRODUCT

TECHNICAL FIELD

A compatible combination of micron size carbon based particles along with beneficial microbial species and conventional plant nutrients into a plant and/or an animal food. This balanced product is a combination of nutrients and microbes, and can be applied as a suspension in water or as a slow release granule. This combination of organic plant food and fertilizer can also be applied as a foliar, as a seed coating, and as an all-in-one granule combination of nutrients and biological agents, to facilitate mineralization, nutrient availability and provide energy to the soil and plants.

BACKGROUND OF THE INVENTION

Nature has perfected the recycling of organic matter, to maintain a balanced and self-renewing cycle of carbon and other nutrients. The present invention facilitates this process and avoids the contamination of the air and water caused by man made large composting operations. Instead of weeks to mineralize waste organic matter this process mills the nutrient filled biomass to micron levels in minutes. It prevents any off gassing of green house gases and creates a condition for ideal and rapid microbe proliferation and subsequent mineralization. Moisture, pH, available usable nutrients, and heat are all critical for their survival and propagation. This process can control these conditions and enhance beneficial microbe propagation.

Prior methods of growing and applying beneficial microbial species include making compost 'teas,' where an inoculation of properly composted organic matter is introduced into a properly constructed brewer. High standards of cleanliness, aeration, careful selection of biomass to grow the microbes, and proper temperature for the diversity of species one wishes to propagate is essential. The brew must be screened and can only be in a liquid form, and typically must be applied within four to five hours after the aeration is completed.

The quality of compost employed to inoculate the brew is of critical importance. Any errors in aeration, temperature and moisture during the weeks long composting process, or contaminated feedstocks can create an anaerobic condition producing many pathological microbes and plant toxic chemicals. The art and science of composting requires a demonstration of critical knowledge and great care in selecting inoculants for brewing and propagating more of the same species in a tea for crop application. All this knowledge and effort costs money and requires a significant investment of time, to gain the needed expertise.

The following is a disclosure of the present invention that will be understood by reference to the following detailed description.

BRIEF DESCRIPTION OF DRAWINGS

FIG. 1 is a schematic representation of a method for wet milling organic matter, according to an embodiment of the invention.

Reference characters included in the above drawing indicates corresponding parts throughout the several charts and tables, as discussed herein. The description herein illustrates one or more preferred embodiments of the invention, in one or more of its forms, and the description herein is not to be construed as limiting the scope of the invention in any manner. It should be understood that the above listed chart or FIGURE is not to scale, and details that are not necessary for an understanding of the present invention by one skilled in the technology of the invention, or render other details difficult to perceive, may have been omitted.

DETAILED DESCRIPTION OF SPECIFIC EMBODIMENTS

The present invention includes a method of wet milling organic matter to produce an organic fertilizer and feed. The novel process employed, includes a physical, chemical, and biological system for the precise creation and placement of nutrients in a pre-determined and beneficial quantity, energy level, and chemical form, into the root zone or alternatively onto the leaves of plants. The invention provides for the total conversion of a storable processed biomass into a precisely known quality and quantity of usable fertilizer 'tea' solution, with no biomass waste, odors, or crop application timing problems. The process of formulating the combination product reduces green house gas emissions by limiting mineralization and composting, to take place only in and around the root zone. The wet-milling action produces products that are disinfected, and are disease and weed free. The final product is manufactured in hours from start to finish from fresh, wet organic matter and when dried is dense, stable, odor free and capable of long-term storage.

The Wet Milling Process 10 is shown in FIG. 1. A primary goal of the Wet Milling Process is to achieve a particle size reduction in the formation of a Liquefied Organic Feedstock 40, which can then be further processed into a Powdered Product 65, or alternatively a Granular Product 75, while maintaining the homogeneous chemical profile and desired size distribution of the particles within the product. The Granular Product is a dry form of the Liquefied Organic Feedstock suspension and is a dust free slow release granule, especially suited for spreading, side dressing or feeding.

The slow release, Granular Product 75 is subject to the biological and physical activities of nature. Both nutrients and microbes can be slowly released as the hard dense granules and particles slowly break down. These granules, which are ideal for shipping and storage, can then be rehydrated into a Liquefied Feed Product 80, back to their original suspended state at an application site. Liquefied Feed Product is a biologically cultured "granular tea" that can then be applied to the soil. When suspended in an aqueous solution of the Liquefied Feed Product the carbon based particles and other molecular forms of plant nutrients of the Powdered Product 65 or the Granular Product are further mineralized through biological activity, enhanced by the present process, including the addition of Microbes 45 to the Liquefied Organic Feedstock 40, as discussed later herein. These suspended, ionic particles and the available forms of the sixteen essential plant nutrients can be distributed to the root-zone or on the leaves of the plant by conventional irrigation methods.

Preferably, the Wet Milling Process 10 begins with a Raw Organic Feedstock 20, shown in FIG. 1. The Raw Organic Feedstock is an unprocessed, raw and fresh "wet" (in the range of 70% water, by weight) organic solids. For the Wet Milling Process, the Raw Organic Feedstock can also include 'mortalities' or expired animal carcasses, and is especially suited for chicken mortalities. By processing raw, fresh and un-composted "wet feedstock," it is possible to prevent the loss of known plant nutrients through off-gassing and drainage. This process step can be augmented with the addition of water and conventional acidic additives.

Also preferably, all biological aerobic and anaerobic decomposition, known as "composting," is halted substantially in the Wet Milling Process 10 of the present invention. In conventional composting processes, valuable heat energy is lost. The composting process is commonly practiced by forming long wind-rows of biomass material, where up to 50% of the biomass gasses off and escapes to the atmosphere, including carbon dioxide, ammonium, ammonia and methane. By preventing composting with the Wet Milling Process, these vital nutrients are retained, for sequestering into the soil, instead. The only gas selectively eliminated in the Wet Milling Process of the present invention is water vapor, which is selectively eliminated when the Liquefied Organic Feedstock 40 is dried. When composting naturally occurs within the soil, the commonly referred to "greenhouse gases" are released in the vicinity of the growing plants, and are taken up by the plant, in accordance to the natural cycle.

Four critical plant nutrients; nitrogen (N), phosphorus (P), potassium (K) and sulfur (S), with all of the remaining macro and micro nutrients along with the heat energy stored in the un-composted bonds, are retained in the Wet Milling Process 40 of the present invention, additionally the achieved particle size reduction in the diameter range of the submicron up to the 150-micron size, produces several advantages, including a rendering of the contaminated organic matter, through destructive mixing with high-shear forces, into a highly disinfected and uniform final product, with less than 10 CFU/gram, as shown in Table 1, below:

TABLE 1

Micronized Poultry Litter Test

| Sample | Concentration | Method |
|---|---|---|
| Micronized Poultry (Dry) | <10 CFU/gm | FDA IX |
| Micronized Poultry (Liquid) | <10 CFU/gm | FDA IX |

Both samples listed in Table 1 demonstrate low microbial concentrations per unit falling below a concentration detection threshold, with the dry sample estimated at $6.5 \times 10^1$ CFU/gm (65 CFU/gm total), and the liquid sample estimated at $4.0 \times 10^{11}$ CFU/ml (40 CFU/ml total).

Additionally, in Table 2 and Table 3, below, both samples demonstrate low microbial concentrations per unit, showing the product produced by the wet milling process of the present invention fall below the detection threshold:

TABLE 2

Micronized Dry Poultry Litter Test

| Micronized Poultry Compost (Dry) | Level Found | Units | Detection Limit | Method |
|---|---|---|---|---|
| Fecal Coliform | n.d. | MPN/gm | 2 | EPA 1681 |
| Salmonella | n.d. | MPN/gm | 0.01 | EPA 1682 |

TABLE 3

Micronized Liquid Poultry Litter Test

| Micronized Poultry (Liquid) | Level Found | Units | Detection Limit | Method |
|---|---|---|---|---|
| Fecal Coliform | 2.0 | MPN/gm | 2 | EPA 1681 |
| Salmonella | n.d. | MPN/gm | 0.01 | EPA 1682 |

Additionally, the Wet Milling Process 10 of the present invention provides a Liquefied Feed Product 80 having a particle size small enough to exhibit classic 'Brownian Movement.' With this movement, the Liquefied Feed Product stays in suspension without continuous stirring, and can be applied through irrigation watering systems onto soil grown plants, as well as to water grown plants and hydroponic crops.

In a preferred embodiment of the Wet Milling Process 10, approximately 90% of the Powdered Product 65 produced by the can be milled between 1-micron to 10-micron size ranges with a Disintegrator Mill 30. Alternatively, the Disintegrator Mill can be controlled to mill approximately 90% of the particles to fall within 40-micron to 50-micron diameter range, for example, as is dependent on the milling equipment speed and length of milling time. A broad range of particle diameter size and shapes can be consistently and selectively produced within narrow ranges of micron sizing. This selective range of particle diameters correlates with the length of time it takes for the microbes and other forces of nature to break down the particles and release the nutrients to the plant. Specifically, a 10-micron diameter particle can break down much sooner than a 50-micron diameter particle. This size discrepancy then serves as an additional controllable time-release mechanism for the all-in-one granule nutrients delivered to the plant, as discussed further herein.

Additionally, as shown in FIG. 1, a Recycle 43 can be used as an option to further reduce the particle size in the Liquefied Organic Feedstock 40, by re-routing the Liquefied Organic Feedstock back to the Disintegrator Mill 30 for another pass and further particle size reduction, as desired.

Preferably the Disintegrator Mill 30 used to reduce the carbon particle size in the Raw Organic Feedstock 20 is a Hockmeyer™ HCPS immersion, as manufactured by Hockmeyer of Elizabeth City, N.C., USA. A preferred Hockmeyer mill is specially modified for organic matter and equipped with an aggressive 'pumper blade.' The Hockmeyer mill is preferable as it can be scaled to meet the challenge of high capacity organic waste processing demands. Its operation is dust free, low noise, capable of uniform particle size within a narrow range of sizes. Alternatively, a wet ball mill could be employed. The wet ball mill can also produce submicron size particles on up to meet the various farm and garden application requirements, and its actions can dewater, disinfect and produce a nearly odor free substrate. Besides 'colloid mills' such as ball mills or bead mills, disc mills, jet mills, rotor-stator mixers or high-pressure homogenizers could be employed as the Disintegrator Mill.

An additional alternative Disintegrator Mill 30 is an ultrasonic mill, as embodied in the ultrasound model UIP16000, manufactured by Hielscher Ultrasonics GmbH, of Berlin Germany. It is expected that the use of high energy ultra-sound is an efficient means for wet milling and micro-grinding of particles in the typical Raw Organic Feedstock 20, and for the manufacturing of superfine-size slurries as employed in the process of the present invention, ultrasound may have many advantages, when compared with common size reduction equipment, and is especially suited to processing and production of a micron-sized product.

After treatment in the Disintegrator Mill 30, the Liquefied Organic Feedstock 40 is dried. Preferably, as shown in FIG. 1, this drying process included a Pre-Dryer 50 followed by a Post-Dryer 54, with a Granulator 53 or a Crumbler 52 operation between the drying steps.

When dried after milling, the Powdered Product 65 of the Wet Milling Method 10 consists of dehydrated micro particles, formed through a dehydration synthesis. The Powdered Product dehydrated micro particle is a hard and dense micro-granule, which meets all typical agriculture spreading requirements. When the Powdered Product is converted into a 'tea,' and optionally with the addition of an oil based binder, the Liquefied Feed Product 80 is ideal for use a foliar spray.

The dense particle of Powdered Product lends to dust free, even spreading, and excellent time-release qualities.
, the present invention provides a seed coating of microbes and nutrients for early release to supply nutrients to the newly sprouting seedling.

As shown in FIG. 1, the Wet Milling Method 10 can produce the Powdered Product 65 or the Granular Product 75. After the Post-Dryer 54 the dried and processed Liquid Organic Feedstock 40 is preferably finished in a Screen 67, to separate the Powdered Product 65 from the Granular Product 75. The Screen is a conventional material sizing screen, with the 'fines,' or powder fractions removed from beneath the internal screens to produce the Powdered Product, and the larger, granular fraction of the screen 'overs' producing the Granular Product.

When either of these refined and dried biomass forms, the Powdered Product 65 or the Granular Product 75 is agitated with a water 81 and aerated with brush scrubbing action against a micron size screen in the presence of a select culture of plant friendly microbes, the suspended particle, microbial rich tea is formed as a Liquefied Feed Product 80. Preferably, this granular tea is allowed to 'brew' for 24 hours to 48 hours. Subsequently, a high nutrient suspension (4-4-4-NPK) rich with environmentally friendly and benign bacteria and fungi are ready to be applied without straining, for application to a crop through any conventional watering system. This means the entire biomass used to make the tea of the Liquefied Feed Product is utilized by the plant, and not just the liquid fraction of a conventionally formed compost tea, which must be passed through a screen to remove larger, insoluble particles. This Liquefied Feed Product tea can be made anytime from the storable Granular Product, and not subject to the parameters of compost manufacturing.

Table 4, below, represents several days of ionic nutrient formation progression, as the components are subjected to the conditions of the innovative process of the present invention:

TABLE 4

Ionic Nutrient Formation Progression (ppm)

| Nutrient | Product #1 | Product #2 | Product #3 |
|---|---|---|---|
| P | 0.08272 | 30 | 16 |
| K | 1.102 | 97 | 93 |
| Ca | 3.459 | 124 | 63 |
| Mg | 0.889222 | 28 | 14 |
| Zn | 0.214235 | 0.3 | 0.2 |
| B | 0.048648 | 2 | 0.8 |
| Mn | 0.034867 | 0.3 | 0.09 |
| Cu | 0.005603 | 0.1 | 0.08 |
| Fe | <0.00001 | 8.0 | 3.0 |
| S | 0.833597 | 14 | 12 |

Product #1, in Table 4 above, is a Granular Tea First Sample, made with Granular Product 75 wetted into a suspension and sampled approximately ten minutes later. Product #2 in Table 4 above, is a Second Sample taken after approximately two days of aeration and exposed to beneficial microbial species. Product #3 in Table 4 above is a Third Sample taken after approximately two days of aeration and exposure to beneficial microbial species.

The above test results in Table 4 are measured in ppm and indicate the increase due to the two days of 'brewing' with two different culture strains added. The increase in ion-ready plant uptake nutrients shows the benefits of adding the micron sized particles to the microbial action. Final microscope evaluation after brewing shows the entire field of micron sized particles in the Liquefied Feed Product 80 able to motate in solution, which is attributable to the action of Brownian Motion. Specifically, the particles in the Liquefied Feed Product have a size range between 1-micron to 5-microns in diameter, and are ready for plant assimilation. The nutrient suspension can be added to the crop root zone independent from a 24-hour, in-tank brewing action in the water 81. This initial step can also be followed by adding the microbes, by way of the irrigation water post nutrient application, into the root zone for proliferation and nutrient conversion. This eliminates the several day tank brewing step. It is expected that higher numbers of microbes in the product and more process control is achieved through tank brewing microbe proliferation with subsequent application, and so this method is preferred.

Several sources of a balanced culture for brew inoculation are commercially available. The two products used in the trial results of Table 4 were a Green-Triangle™ formula, and a Tainio™ brand of microbes obtained from worm castings confined inside a 50 standard mesh sized fabric 'pillow-type' casing, which promises to provide natural enzymes and worm selected microbes to a tea culture. Soaking the casing in the brew tank for a short period of time serves to inoculate the solution.

Another unique benefit made possible with the Wet Milling Method 10, is the ability to encapsulate viable spore forms of the Microbes 45, throughout the hard and dewatered Granular Product 75. This encapsulation allows for the release of these dormant microbes throughout the effective life of the granule, during its natural breakdown in the soil. The Microbes are released simultaneous as the nutrients are likewise being released. This is made possible by introducing the Microbes already in the spore form, and by introducing the 'friendly' Microbes after the lethal threshing of the indigenous and harmful microbes is finished by action of the Disintegrator Mill 30. To preserve the Microbes, they are mixed into the Liquefied Organic Feedstock 40 without use of the wet ball mill or other destructive mixer. The advantages of the created easy and quick to dry dewatered biomass is evidenced in the ability to spread the milled biomass of the Liquefied Organic Feeds out as a sheet on a belt for flash drying in the Pre-Dryer at temperature and time that do not harm the encased Microbes. Alternatively, as shown in FIG. 1, the Microbes can be introduced onto the surface of the drying Liquefied Organic Feedstock, as present in the Post-Dryer 54, after the Liquefied Organic Feedstock is either crumbled in the Crumbler 52, or alternatively granulated in the Granulator 53. This places the Microbes on the surface of the Powdered Product 65 and ready for immediate activation upon contact with soil or water.

Tests have shown that if the drying steps of the Wet Milling Method 10 can occur within approximately 25 minutes at starting temperatures of 150 degrees F., and not exceed 300 degrees F., in an environment with 10% or less moisture and without sugars. The beneficial microbes can stay viable in the hardened granule for years at a time. When water, heat, and nutrients are made available, they come alive to do their 'jobs,' as nature has assigned.

A particle of resultant Liquefied Feed Product 80 that has an irregular shape can also act as a mild abrasive as it passes through the drip or other irrigation lines. Microscopic examination of the micronized Powdered Product 65 of the Wet Milling Method 10 of the present invention confirms that irregular shaped particles predominate. Plot tests have shown that a drip-line using the organic fertilizer product of the present invention remains clean and unobstructed, likely due to the abrasive action of these particles with consistent but irregular diameters.

Additional advantages of the granular Liquefied Feed Product 80 'tea' made by the present invention, include the use of the sterile biomass of the Granular Product 75 or the Powdered Product 65 as starter and mixed with water 81, which provides complete control over which organisms will propagate in the finished tea. Additionally, these granules can be re-activated with a strong in-water grinding agitation, or by re-milling into a powder or paste and brought again into suspension with water to form the granular tea with a know nutrient analysis. Unlike conventional compost tea, all the micro-biomass suspension is made available to the water stream going to the plant. In a conventional compost teas, only soluble elements of the granular tea are allowed through the filter and all the insoluble and large particles are left behind so as not to pose a irrigation emitter plugging problem. The un-composted organic material that has been processed in the mill can be formulated to meet the nursery potting standards required for planting seed, cuttings and seedling propagation. This eliminates the need for composting such organic products prior to bagging. For example, a bag of Miracle-Grow™ compost, sold as a potting soil, contains approximately 58% water by weight, in the typical bag of product. This represents considerable waste passed to the consumer, whom is paying a premium for a lot of water and energy-spent biomass.

Another significant advantage of eliminating the conventional composting step as accomplished by the Wet Milling Process 10 is the preservation of the energy and nutrients lost during the conventional composting process. For example, heat energy is then preserved for later release through the composting action of the applied microbes, which use this heat energy to continue their demineralization after being deposited in the root zone of the plant.

Still another advantage of the product formed by the Wet Milling Process 10 of the present invention is the economy of volume and weight (or density, when milling is followed by the drying step.) A dry compost typically weighs approximately 30 pounds per cubic foot, up to 35 pounds per cubic foot. However, the dried biomass of the Powdered Product 65, or the Granular Product 75 comprising dust free and flow-able granules, weighs approximately from 54 pounds per cubic foot, up to 65 pounds per cubic foot. If short transportation hauls or in-house manufacturing are possible, the application of the Liquefied Organic Feedstock 40 can be added directly to the water source, therefore eliminating drying costs all together.

Disinfection requirements may be meet with milling in the Disintegrator Mill 30 only. However, certain regulations and restrictions may prohibit the application of the product to a crop anytime during the season and still meet regulatory rules, such as prohibiting biomass treatments to crops within 120 day of harvest, to achieve the required disinfection and open-air exposure.

The initial step of the Wet Milling Process 10 with the milling of the Raw Organic Feedstock 20 biomass to the 1-micron diameter to 10-micron diameter size range, converts most of the bound water within the Raw Organic Feedstock to free water. The 70% free water content Liquefied Organic Feedstock 40 with its micron size biomass, is easily manipulated to be subject to various drying methods. For example, if granules are preferred, a thin coat of the Liquefied Organic Feedstock is spread or sprayed onto a belt of the Pre-Dryer 50 and subjected to a heat source. The thickness of the sprayed coating determines the size of the granule and efficiency of the drying, and is most preferably preformed by infrared heating. Additionally, subjecting the micron size particles to flash drying may be achieved using a Processing Engine 55, which is preferably a pulse engine, or alternatively a conventional spray dryer, either employed to form the high-quality Powdered Product 65.

TABLE 5

Effect of Nitrogen Sources on Wheat Dry Matter - 'Shano' Soil

| Material | Wheat Dry Matter Weight (weight of dried potted plant in grams) |
| --- | --- |
| Urea | 9.3 |
| GTC ™ | 10.5 |
| Compost | 6.7 |
| Control | 6.4 |

In Table 5, a "Shano" soil was utilized for the tests. Shano is a typical deep and well drained 'Loess' type of soil, which is an aeolian sediment typically formed by the accumulation of wind-blown silt.

Water conservation is an additional benefit of the Wet Milling Process 10. Water delivery systems that use the absolute minimum of water can be readily married to a fertilizer suspension product produced by the wet milling methods of the present invention. With the fertilizer suspension product a precise placement of nutrients along with water, into the root zone is efficiently achieved in drip, micro-spray, and hydroponic systems.

Certain plants varieties and soil types require a side-dressing of fertilizer throughout the growing season. To side-dress plants, fertilizer is applied to the soil on or around the sides of the plant. This practice is especially important in sandy soils that do not hold nutrients well, and also during growth spurts, when plants require additional nutrients. Typically, side-dressed fertilizer is applied either in a narrow furrow down a row, or around each individual plant. Granular fertilizer forms are preferred for use at least 6 inches to 8 inches away from plant stems. The fertilizer is raked into the soil and then watered.

Powder, Tea and Time Released Granule Formation

An additional benefit of the Wet Milling Process 10 is the ability to form a Powdered Product 65 that is able to quickly and efficiently convert into a Liquefied Feed Product 80 in suspension, or alternatively form a Granular Product 75 that is dust free, and slow-releasing, or. Most preferably, the slow-release Granular Product is formed during the drying process with the aid of the Granulator 53, and requires no additional equipment. However, as shown in FIG. 1, a Hammer Mill 73 can be employed to process fines or 'unders' from the Screen 67, to convert them into a more usable, granular form of the Granular Product.

In preferable processing steps of the Wet Milling Process 10, the milled biomass of the Liquid Organic Feedstock 40, is sprayed or rolled out on a dying belt in a sheet of a predetermined thickness. This predetermined thickness of milled biomass is then subjected to heat and dehydration. A phase change of the milled biomass takes place during the first few minutes of thermal exposure. The milled biomass losses its stickiness and can be manipulated into various shapes and thicknesses with the use of a cookie cutter roller placed down-stream in the drying process.

As the removal of water from the milled biomass of the Liquid Organic Feedstock 40, continues, a dehydration synthesis occurs. As the energy of the heat removes the water molecules, new positive and negative bonding sites are created in the dehydrated biomass. This allows the formation of new molecules to satisfy these electrical positive and negative charges among the remaining essential sixteen plant nutrients. These bonds are strong and plentiful in the Powdered Product 65 and in the Granular Product 75 forms.

In contrast to the firm Granular Product 75, the Powdered Product 65 can be formed by atomizing the freshly milled biomass with the use of a spray dryer or the sonic vibration of a pulse engine dryer. Both the granular and powder forms are then produced depending on which drying processes are utilized. This is a major cost and quality advantage over current practices of disk prilling, compaction, and pellet formers, all of which require the addition of binder materials and supplemental moisture, and also demand additional processing equipment and operational labor. Additionally, the products of Wet Milling Process 10 nearly double the typical density of the original Raw Organic Feedstock 20 biomass, through particle size reduction, compaction and dehydration.

Most preferably, a conversion of the Granular Product 75 back to the Liquefied Feed Product 80 'tea' form is accomplished by setting up a recycling tank, where the Granular Product can be added into the recycling tank with water 81 at a predetermined rate. This tea admixture is then recycled through a pressure assisted agitator. As the water softens the granules they are subjected to the crushing action of circulating brushes against a predetermined in size micron wetscreen, preferably with an appropriate sieve size, until a uniform suspension is reestablished similar to the one achieved with the original milling of the raw feedstock. The Liquefied Feed Product will have a size range of the suspended particles of approximately 1-micron to 10-microns in diameter, as determined by the wet-screen's sieve size and the action of the solvating water in the Liquefied Feed Product.

By regulating the thickness of the milled biomass of the Liquid Organic Feedstock 40, as spread onto the drying belt of the Pre-Dryer 50, crumbled granules of different masses can be manufactured. Granules of different thicknesses and area sizes will dissolve at different rates in the soil. Therefore, one can custom-make a granule to meet different release times to meet different crop, soil, and environment needs. This is in addition to governing release rate by controlling the particle size, as discussed above. Therefore, pre-engineering the release time, or rate of product release for the Granular Product 75 can be achieved through a selection of the Raw Organic Feedstock 20 with a selected mass of the individual particles in each granule of the Granular Product. Selecting the mass of the individual particles in each granule can be accomplished by varying the action of the Disintegrator Mill 30, and a mass of particles comprising the individual granules of the Granular Product, as controlled by the actions of the Crumbler 52 and the Granulator 53.

In addition to producing a fertilizer for plant use, the Wet Milling Process 10 of the present invention can also process mortalities for use in the fertilizer or an animal feed. These pre-ground animal sources of nutrients can be milled and handled in the same manner as plant origin feedstocks. Additionally, these animal sources of nutrients can be combined with the plant sources to be integrated into a balanced fertilizer, or can be micronized, disinfected, and substantially sterilized and formulated into an animal food.

If the Raw Organic Feedstock 20 is desired to be rendered fit for human consumption, the Raw Organic Feedstock can include the known edible weeds and the many edible insects found in most places on earth, as an option. With the Wet Milling Process 10, such Raw Organic Feedstocks can be converted to an edible product, such as a paste, a suspension or a dried cake, all derived from the Powdered Product 65. The edible products can be much more palatable for human consumption in these modified forms. Also, the Powdered Product makes the edible products subjectable to long term storage.

The terms "approximately" and "substantially" are employed herein throughout, including this detailed description and the attached claims, with the understanding that is denotes a level of exactitude commensurate with the skill and precision typical for the particular field of endeavor, as applicable.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A wet milling process for an organic matter substantially halting an aerobic biological decomposition of the organic matter and substantially halting an anaerobic biological decomposition of the organic matter, comprising the steps of:
   a) milling a raw organic feedstock in a disintegrating mill with the raw organic feedstock in a fresh and substantially un-composted condition, substantially halting the aerobic biological decomposition of the raw organic feedstock and substantially halting the anaerobic biological decomposition of the raw organic feedstock, the raw organic feedstock including a wet and substantially un-composted organic matter, and the wet and substantially un-composted organic matter having long-chain carbon molecules;
   b) fracturing the long chain carbon molecules of the wet and substantially un-composted organic matter to a particle size that will support suspension in water to transform the raw organic feedstock into a liquefied organic feedstock without composting the raw organic feedstock;
   c) adding a microbe culture to the liquefied organic feedstock without composting the liquefied organic feedstock, to form a fortified liquefied feed, and the fortified liquefied feed including a blend of fractured, and substantially un-composted-carbon particles;
   d) further fracturing the long chain carbon molecules with the microbe culture, into ionic forms of exchangeable plant nutrients; and e) drying the fortified liquefied feed at a temperature below 300 degrees F., within approximately a 25 minute period of time after milling the raw organic feedstock to form a granular product having encapsulated microbes.

2. The wet milling process of claim 1, additionally comprising the steps of:
f) retaining within the wet and substantially un-composted organic matter all volatile gases initially present in the raw organic feedstock, including compounds containing a NH3, a NH4, a CO2, and a CH3.

3. The wet milling process of claim 1, additionally comprising the step of:
f) fracturing the carbon chains and animal and plant cells to a degree that a bound water is exposed to a free evaporation of the bound water.

4. The wet milling process of claim 1, additionally comprising the step of:
f) converting the granular product into a nutrient and biologically balanced suspension tea.

5. The wet milling process of claim 1, wherein the step of adding a microbe culture to the liquefied organic feedstock to form a fortified liquefied feed, additionally includes the step of:
f) adding an aerobic microbe culture to the liquefied organic feedstock that is selected to be beneficial to plants.

6. The wet milling process of claim 1 additionally comprising the steps of:

f) maintaining the encapsulated microbes in the granular product without the addition of a sugar; and g) storing the encapsulated microbes in an environment having less than 10% free water.

7. The wet milling process of claim 1, additionally comprising the step of:
f) forming a time release granule through dehydration synthesis.

8. The wet milling process of claim 7, additionally comprising the step of:
g) applying the time-release granule to a soil with a spreader.

9. The wet milling process of claim 7, additionally comprising the step of:
g) side-dressing a crop with the time-release granule.

10. The wet milling process of claim 7, additionally comprising the step of:
g) selecting a feedstock and selecting a mass of the time-release granule and a mass of particles comprising the time-release granule to achieve a desired rate of product release for the granular product, with the desired rate of product release for the granular product related to the mass of the time-release granule and the mass of particles comprising the time-release granule.

11. The wet milling process of claim 1, additionally comprising the step of:

f) disinfecting the raw feedstock within the disintegrating mill through a high shear-force thrashing of the fortified liquefied feed including the microbe culture.

12. The wet milling process of claim 1, additionally comprising the step of:
f) drying the biomass with a sheet dryer.

13. The wet milling process of claim 1, additionally comprising the step of:
f) drying the biomass with a flash dryer.

14. The wet milling process of claim 1, additionally comprising the step of:
f) drying the biomass by a pulse jet engine dryer to atomize and flash-dry the liquefied organic feedstock.

15. The wet milling process of claim 1, additionally comprising the step of:

f) selecting an animal source of nutrients originating from mortalities for use as the raw organic feedstock.

16. A wet milling process for an organic matter substantially halting an aerobic biological decomposition of the organic matter and substantially halting an anaerobic biological decomposition of the organic matter, comprising the steps of:

a) milling a raw organic feedstock in a disintegrating mill with the raw organic feedstock in a fresh and substantially un-composted condition, substantially halting the aerobic biological decomposition of the raw organic feedstock and substantially halting the anaerobic biological decomposition of the raw organic feedstock, the raw organic feedstock consisting of a wet and substantially un-composted organic matter, and the wet and substantially un-composted organic matter having long-chain carbon molecules;

b) fracturing the long chain carbon molecules of the wet and substantially un-composted organic matter without composting, to a particle size that will support suspension in water as a liquefied organic feedstock;

c) adding a microbe culture to the liquefied organic feedstock to form a fortified liquefied feed, and the liquid feed including a blend of fractured, un-composted-carbon particles; and d) drying the fortified liquefied feed to form a granular product having encapsulated microbes within approximately a 25 minute period of time after the formation of the granular product, at a temperature below 300 degrees F.;

e) maintaining the encapsulated microbes without the addition of a sugar; and f) storing the encapsulated microbes in an environment with less than 10% free water.

17. The wet milling process of claim 16, additionally comprising the step of:

g) selecting a mass of particles to form a time-release granule to achieve a desired rate of product release for the granular product, with the desired rate of product release for the granular product related to the mass of particles comprising the time-release granule.

* * * * *